United States Patent [19]

Newell et al.

[11] Patent Number: 4,911,517

[45] Date of Patent: Mar. 27, 1990

[54] MEANS FOR CLAMPING FIBER OPTICAL CABLE

[75] Inventors: Edwin R. Newell, Wake Forest; Terry E. Franks, Leicester, both of N.C.

[73] Assignee: Square D Company, Palatine, Ill.

[21] Appl. No.: 242,359

[22] Filed: Sep. 9, 1988

[51] Int. Cl.[4] ............................ G02B 6/36; G02B 7/26
[52] U.S. Cl. ................................ 350/96.20; 350/96.10
[58] Field of Search ............................ 350/96.10, 96.20

[56] References Cited

U.S. PATENT DOCUMENTS

4,627,686 12/1986 Szentesi ............................ 350/96.20

Primary Examiner—William L. Sikes
Assistant Examiner—Robert E. Wise
Attorney, Agent, or Firm—Donald P. Reynolds; James Earl Lowe, Jr.

[57] ABSTRACT

A fiber-optic switch uses a single optical fiber for two-way communication with light. A switching mechanism has no electrical part and is thus appropriate for placement in an area having explosive or combustible materials. The optical fiber can be cut to length in the field and can be installed without special tools or training. The fiber is held in place by a clip that is constrained to compress the fiber and grip it securely. A snap-action mirror reflects light back into the fiber in one position and does not reflect it in another position. An electronic circuit provides pulsed light and determines coincidence of sent and received pulses to discriminate against operation of the switch by ambient light or other spurious signals.

3 Claims, 14 Drawing Sheets

MEANS FOR CLAMPING FIBER OPTICAL CABLE

BACKGROUND OF THE INVENTION

This invention relates to control switches for electrical devices. In particular, it relates to devices for controlling electrical equipment from an area that contains or may contain explosive fumes or vapors, dust, or the like.

Control of electrical equipment from areas that contain explosive vapors presents some technical problems that have been solved in various ways. A hazard arises because the opening of electrical contacts carrying current in a circuit that has any inductance will produce an arc that may ignite the explosive vapors. One approach that has been taken in the past to prevent this is the use of an explosion-proof enclosure. This is an enclosure that is made to be sealed so as to be water-tight and pressure-tight. Enclosures for electrical devices to be used in such an atmosphere are typically cast instead of stamped. They are normally assembled with gaskets and bolts to maintain a seal. The result is an enclosure that is considerably more expensive to purchase than those made for areas that are not hazardous. The hazardous-duty enclosures require maintenance not required by enclosures designed for non-hazardous areas.

One approach to the problem of electrical control in hazardous areas has been the so-called inherently safe switch. This has been done using optical fibers as a means for linking mechanical controls in the hazardous area to electrical controls outside the hazardous area. In such a system, a source of light outside the hazardous area is coupled to an optical fiber that is taken to an input device in the hazardous area. The input device, which may be a pushbutton, foot switch, limit switch, pressure switch or the like, includes an interruptible path for light which may be reflected to a second fiber in the input device that is connected back to a receiver outside the hazardous area. Operation of the switch in the hazardous area either permits the passage of light or interrupts it. Systems such as the one described have been used in petrochemical processing plants, refineries, plants manufacturing explosives, grain-handling facilities and the like.

The inherently safe systems now in use present several disadvantages. The first of these is the frequent use of two optical fibers for each switch. One optical fiber is used to conduct light from the light source to the input device, and a second is used to conduct reflected light back to a receiver outside the hazardous area. The light source and receiver are often located together so that a double optical cable may be used. However, the use of two such cables often requires four cable terminations that must be made to connect an inherently safe switch.

Another disadvantage that must be overcome in an optical switch is spurious responses to ambient light. A light-operated switch should respond only to a signal from a desired source, and should not be triggered by changes in the ambient light level.

It is also useful if an optical switch for inherently-safe use is made to be installed by electricians without special tools or training. If an optical switch requires field installation of terminations for which the ends of an optical cable must be ground and set with epoxy or the like, the switch is made much more difficult to use.

SUMMARY OF THE INVENTION

It is an object of the present invention to provide a better fiber-optic electrical switch.

It is a further object of the present invention to provide a snap-action mirror for a fiber-optic electrical switch.

It is a further object of the present invention to provide a fiber-optic switch with an electronic circuit that minimizes spurious responses.

It is a further object of the present invention to provide a fiber-optic electrical switch that functions with a single optical fiber.

It is a further object of the present invention to provide a fiber-optic electrical switch using plastic optical fiber that is cut with a razor or the like.

It is a further object of the present invention to provide a fiber-optic electric switch with a latching clip to hold an end of an optical fiber in place.

It is a further object of the present invention to provide a fiber-optic electrical switch that can be installed in the field without installing a special optical termination.

Other objects will become apparent in the course of a detailed description of the invention.

A fiber-optic switch uses a single optical fiber for two-way communication with light. A switching mechanism has no electrical part and is thus appropriate for placement in an area having explosive or combustible materials. The optical fiber can be cut to length in the field and can be installed without sepcial tools or training. The fiber is held in place by a clip that is constrained to compress the fiber and grip it securely. A snap-action mirror reflects light back into the fiber in one position and does not reflect it in another position. An electronic circuit provides pulsed light and determines coincidence of sent and received pulses to discriminate against operation of the switch by ambient light or other spurious signals.

DETAILED DESCRIPTION OF THE INVENTION

Figure 1:
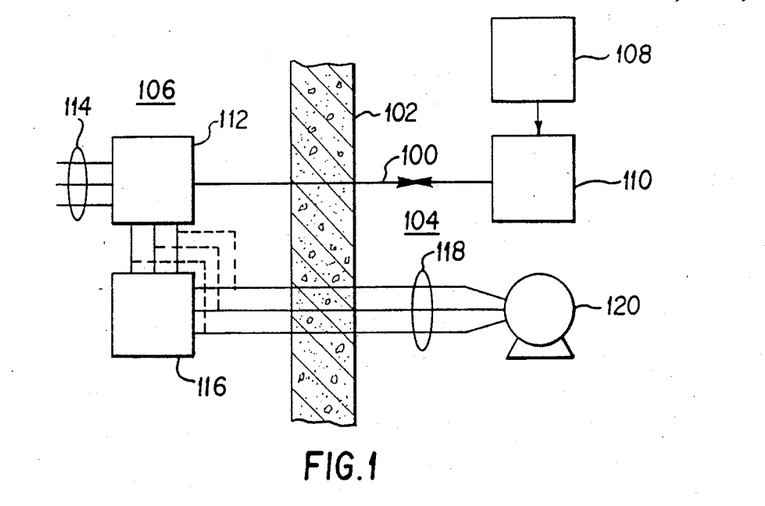
FIG. 1 is an overall block diagram of an apparatus for the practice of the present invention.

FIG. 1 is an overall block diagram of an apparatus for the practice of the present invention. In FIG. 1, an optical fiber 100 is passed through a wall 102 that separates an explosive region 104 from a safe region 106. The explosive region 104 may contain explosive vapors, dust or the like. An operator 108 is located in the explosive region 104 to operate a switch module 110. The operator may be a push button, rotary switch, limit switch, proximity switch or the like. The operator 108 and the switch module 110 contain no electrical components. The switch module 110 is connected by the optical fiber 100 to a transceiver 112 that is located in the safe region 106. The transceiver 112 generates light signals that are coupled by the optical fiber 100 to the switch module 110 and back. The transceiver 112 connects power lines 114 either to a relay 116 and then to switched power lines 118, or directly from the transceiver 112 to the switched power lines 118. The switched power lines 118 are here shown connected to a motor 120, which is taken as a typical load to be controlled by the present invention. Any other electrical load would do equally as well for the practice of the present invention.

Figure 2:
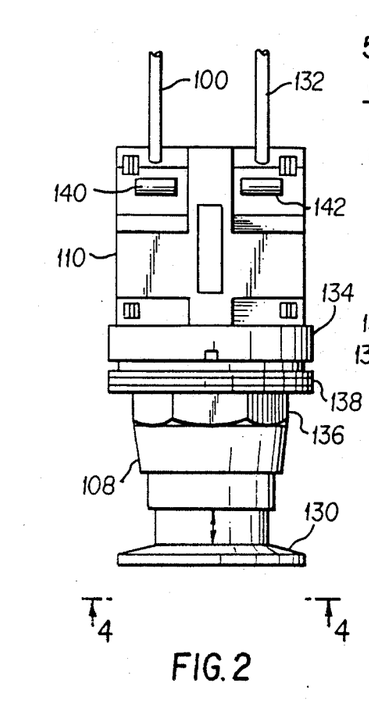
FIG. 2 is a front view of a module and an operator for the practice of the present invention.
Figure 3:
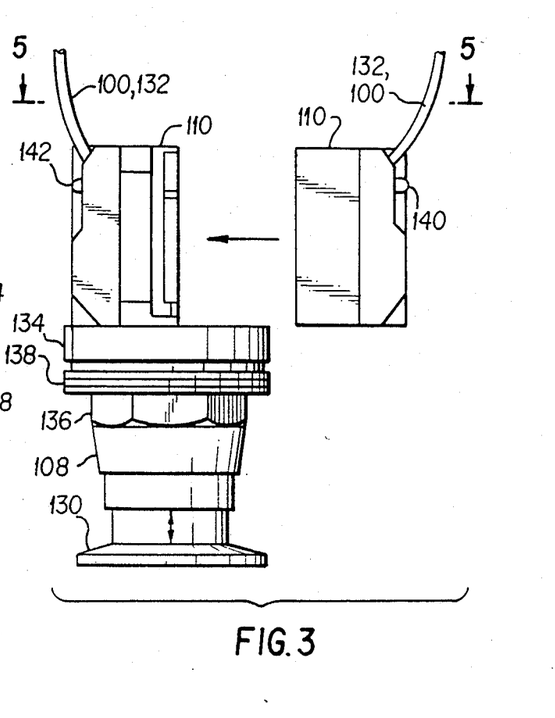
FIG. 3 is a side view of the module and operator of FIG. 2.
Figure 4:
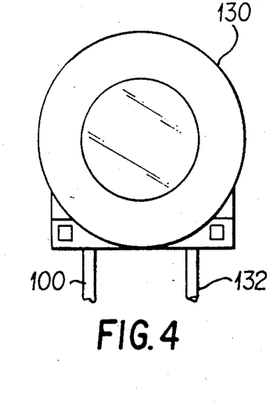
FIG. 4 is a view of the module and operator along viewing lines 4—4 of FIG. 2.
Figure 5:
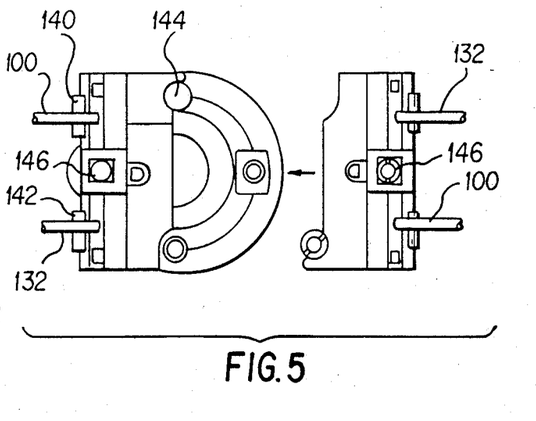
FIG. 5 is a view of the module and operator along viewing lines 5—5 of FIG. 3.

FIG. 2 is a front view of a module and an operator for the practice of the present invention; FIG. 3 is a side view of the module and operator of FIG. 2; FIG. 4 is an end view of the module and operator along viewing lines 4—4 of FIG. 2, and FIG. 5 is a top view of the module and operator of FIG. 3 along viewing lines 5—5 of FIG. 3. In FIGS. 2, 3, 4 and 5, the operator 108 is a dual-position push button operator. A pushbutton 130 is in a neutral position which will be seen to interrupt the flow of light in the optical fiber 100 and also in an optical fiber 132. It will be seen that with the push button 130 in a neutral position, light is interrupted and the optical fibers 100 and 132. When the push button 130 is pushed in from the neutral position, one of the optical fibers 100 and 132 is caused to engage a reflector that returns light to the receiver 112 of FIG. 1. The other of the optical fibers 100 and 132 is caused to return light when the push button 130 is pulled. This is only one of the many different choices for the operator 128 of FIGS. 2, 3, 4 and 5. The operator 108 includes a collar 134 that is attached to an opening in a panel box (not shown) by a nut 136 that compresses gaskets 138. The optical fiber 100 is held in place by a clamp 140 and the optical 132 is held in place by a clamp 142. Details of the clamps 140 and 142 will be shown below. Two screws 144 and 146 secure the switch module 110 to the operator 108.

Figure 6:
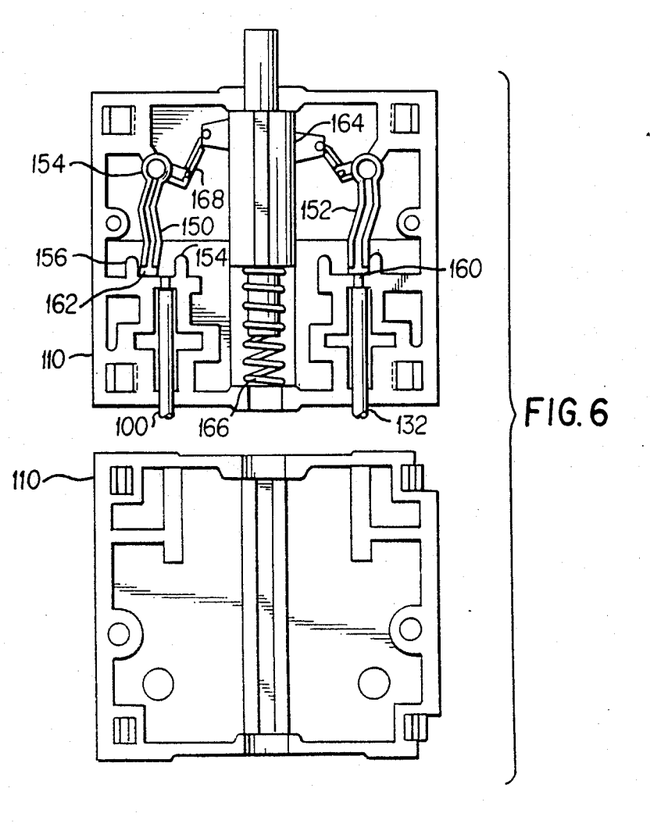
FIG. 6 is a split plan view of an operator for the nature of the present invention.

FIG. 6 is a split plan view of an operator for the practice of the present invention. In FIG. 6, two separate fiber optic cables 100 and 132 are shown. Either by itself is adapted for the practice of the invention, but the two are shown because it is often desirable to have a switch that provides either a normally closed switch, which is referred to in terms of a fiber optic switch as normally light (NL), or a normally open switch, normally dark (ND). Thus, in FIG. 6 the arm 150 is ND and the arm 152 is NL. The arm 150 includes an axle 154 that allows a limited amount of rotation of the arm 152. That rotation is limited by a first stop 156 that stops the arm 150 in a position that is normally dark. A second stop 158 stops the arm 150 in a position that is normally light. In the preferred embodiment the change between these two positions represented a rotation about the axle 154 of about six degrees. This is a matter of design choice. The arm 150 could equally as well have been caused to translate or execute any other motion that would either place a mirror 160 so as to reflect light as shown with the arm 152, or that would place a mirror 162 away from the fiber 100 so as to prevent reflection.

Figure 7:
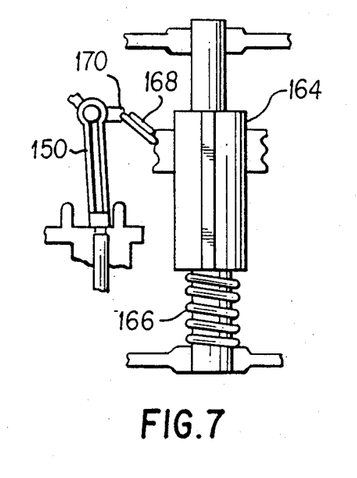
FIG. 7 is a side view of the stem and mirror of FIG. 6 in the on position.
Figure 8:
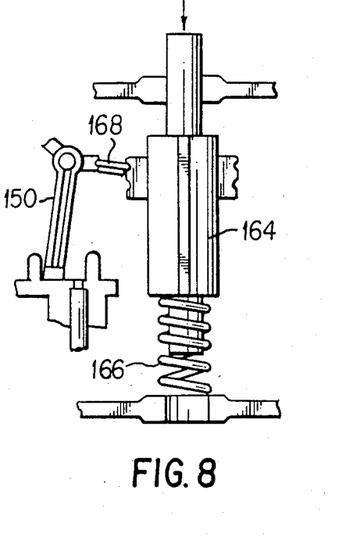
FIG. 8 is a side view of the stem and mirror of FIG. 6 in the unstable snap position.

For both the arms 150 and 152, snap action is initiated by a slider 164 that operates against a coil spring 166. The snap action is caused by a torsion spring 168 that exerts a force to push a contact point 170 away from the slider 164. Movement of the slider 164 to an overcenter position snaps the arm 150 into a position opposite to the one it has been in. FIG. 7 shows the arm 150 in one of the two stable positions, while FIG. 9 shows the arm 150 in the unstable position in which it is about to snap or toggle.

Figure 9:
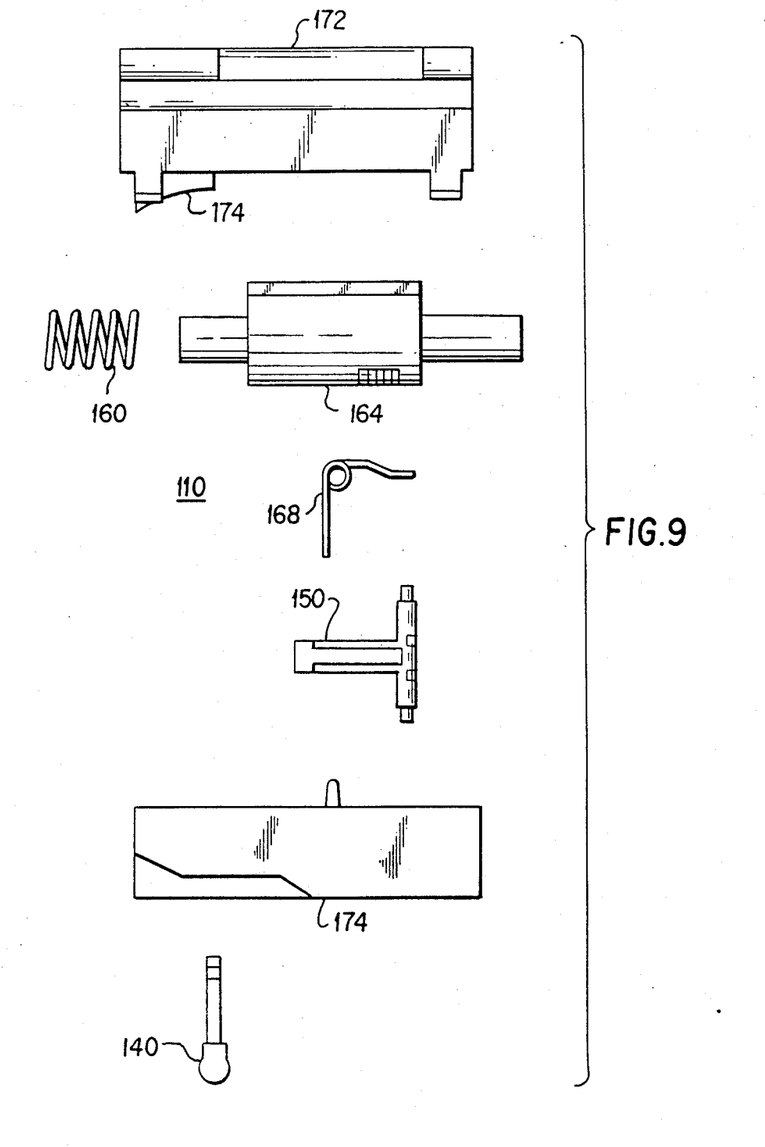
FIG. 9 is an exploded view of the components of the module of the present invention.

FIG. 9 is an exploded view of the module of the present invention. In FIG. 9, an upper portion 172 of the switch module 110 has a curved groove 174 that serves to guide an inserted optical fiber to a stop that is not shown. The slider 164 is assembled within the upper portion 172 and is biased in a preferred direction by the spring 166. The spring 168 is shown here in its unstressed condition. When connected, it couples the slider 164 to the arm 150 as described above. A bottom portion 174 of the housing 110 captures the fiber clamp 140.

Figure 10:
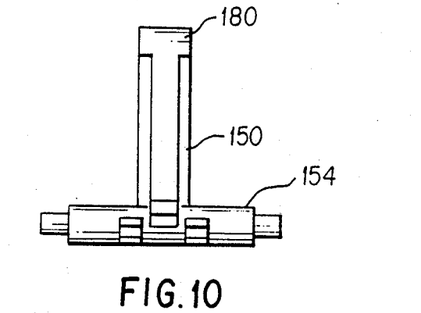
FIG. 10 is a front view of the arm 150 of FIG. 6.
Figure 11:
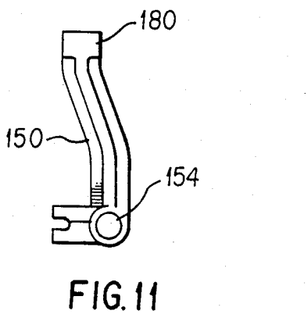
FIG. 11 is a side view of the arm 150 of FIG. 6.
Figure 12:
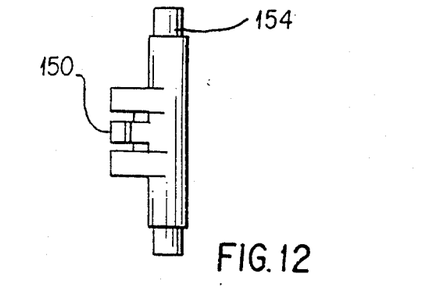
FIG. 12 is a bottom view of the arm 150 of FIG. 6.

FIGS. 10, 11 and 12 are respectively front, side and bottom views of the arm 150 of FIG. 6. In FIGS. 10, 11 and 12, a mirror 180 is preferably made of small reflecting spheres to return incident light in its direction of entry, although good results could also be attained with a silvered or other reflecting surface. The axle 154 could equally as well comprise a hub for engagement with a fixed projection, and the mirror 180 could be given its relative motion by translation rather than rotation. These are matters of design choice.

Figure 13:
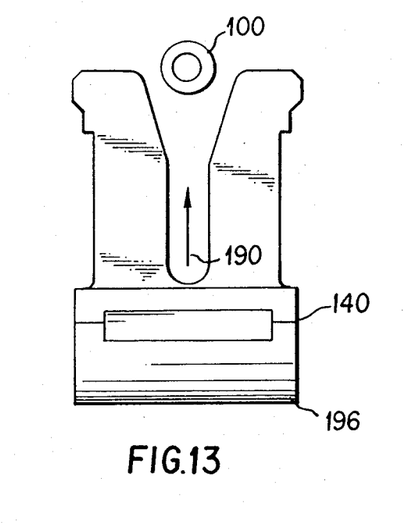
FIG. 13 is a side view of the clamp in the unclamped position.
Figure 14:
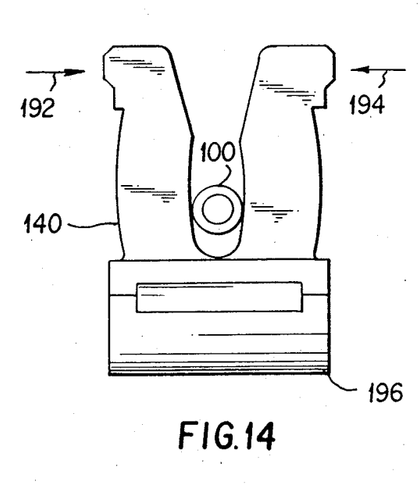
FIG. 14 is a side view of the clamp in the clamped position.
Figure 15:
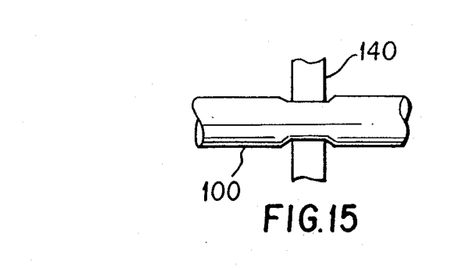
FIG. 15 is a top view of the clamp.

FIGS. 13, 14 and 15 are respectively two side views and a top view of the clamp 140 of FIG. 2. In FIGS. 13, 14 and 15, the optical fiber 100 is shown first in its uncaptured position, free of the clamp 140. When the optical fiber is in a desired position, motion of the clamp 140 in the direction of the arrow 190 captures the optical fiber 100 as shown in FIGS. 14 and 15 by compressing the optical fiber 100. Two arrows 192 and 194 indicate the directions of forces exerted on the clamp 140 by the switch module 110. A handle 196 protrudes from the module 110 to enable an operator to clamp the optical fiber 100.

Figure 16:
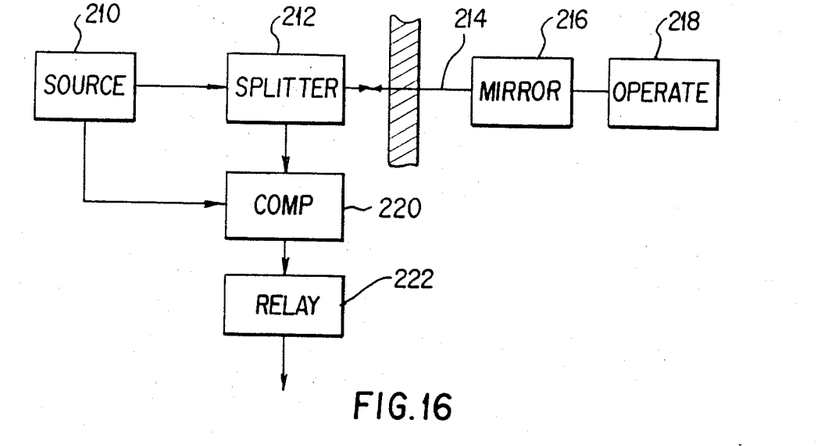
FIG. 16 is a functional block diagram of a transceiver for the practice of the present invention.

FIG. 16 is a functional block diagram of a transceiver for the practice of the present invention. In FIG. 16, a source 210 produces light that is taken to a splitter 212.

In the preferred embodiment of the invention the source 210 was a light-emitting diode that was pulsed with square waves at a frequency of 16 kHz. If the source is pulsed, the frequency and duty cycle are matters of design choice. Whatever the nature of the light from the source 210, the light enters the splitter 212 where it is coupled into the optical fiber 214 to be taken to the mirror 216 for reflection and return to the splitter 212. The operator 218 places the mirror 216 into or out of a reflecting position as described above. Outputs from the source 210 and the splitter 212 are taken to a comparator 220 to provide an indication that the operator 218 has been operated. In the preferred embodiment of the invention, the source 210 was pulsed to increase the discrimination between the on condition and the off condition. The comparator 220 was part of a circuit to be described more fully later that compared source pulses with received pulses and produced an output to a relay 222 only upon receipt of a predetermined number of coincident pulses. This discrimination could also be handled with a dc light source by level comparison in the comparator 220. In a typical application an optical fiber without a mirror, in the dark condition, returns about four percent of the light from the source 210. This presents a possible means of distinguishing between the on and off conditions. However, the pulse method is preferred.

Figure 17:
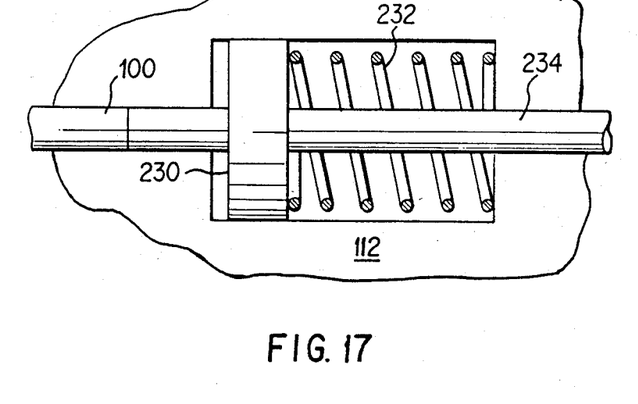
FIG. 17 is a partial sectional view of the transceiver 112 of FIG. 1.

FIG. 17 is a partial sectional view of the transceiver 112 of FIG. 1 showing how contact is made with an optical fiber. In FIG. 17, the optical fiber 100 is butted against a terminator 230 that is held against the end of the optical fiber 100 by a spring 232. The terminator 230 is preferably a factory-produced termination attached to a fiber optical cable 234 that is connected by epoxy or similar means to make a termination. When the optical cable 100 is cut by a razor or similar means, the spring-loaded support of the terminator 230 makes a low-loss contact between the fiber 100 and the cable 234 that minimizes unwanted reflections.

Figure 18:
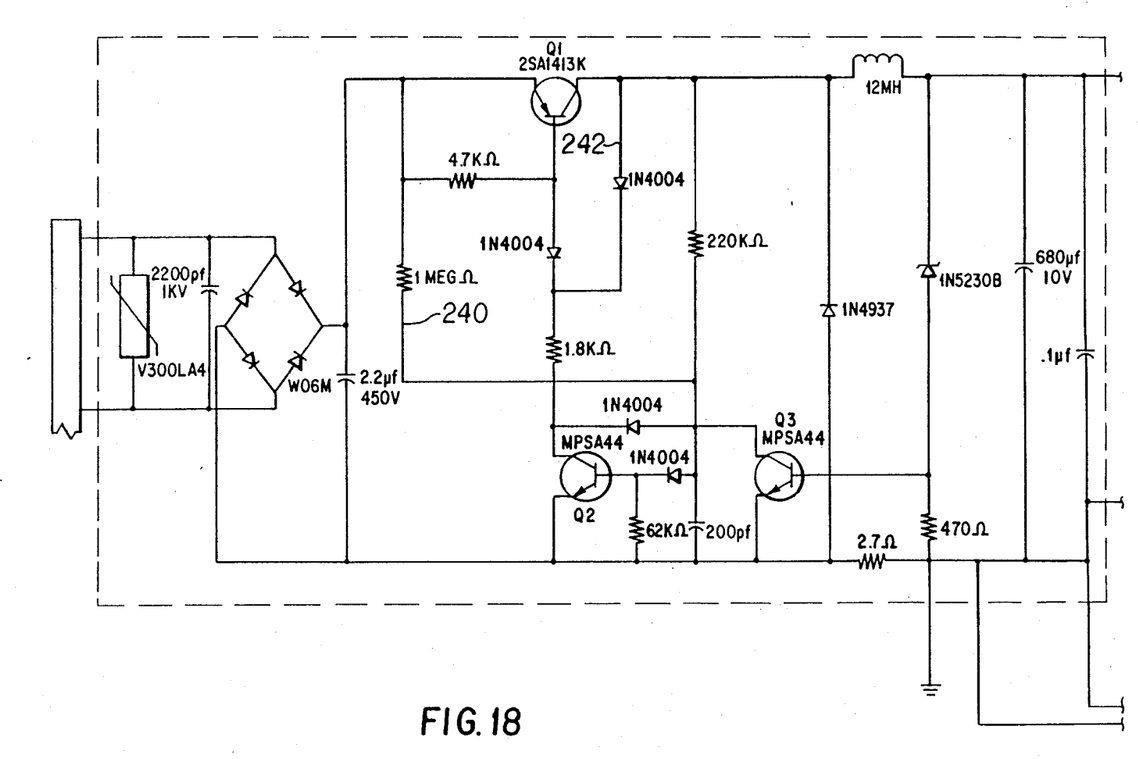
FIG. 18 is a circuit diagram of an electronic circuit in the transceiver 112.

FIG. 18 is a circuit diagram of an electronic circuit in the transceiver 112 that produces and detect light for the practice of the present invention. In FIG. 12, a power supply 240 produces operating voltages for the transceiver 112 from a wide range of input ac or dc voltages. The power supply 240 includes a voltage regulating circuit 242 that produces a regulated voltage to operate parts of the circuit. An emitter 244, typically an LED, produces light that is taken to the optical fiber 100 through a splitter, and a detector 246, typically a photodiode, detects light returned in the optical fiber 100. The emitter 244 and the detector 246 are operated under the conrol of an application-specific integrated circuit (ASIC) 248, which also controls a transistor 250 that drives a relay 252.

Figure 19:
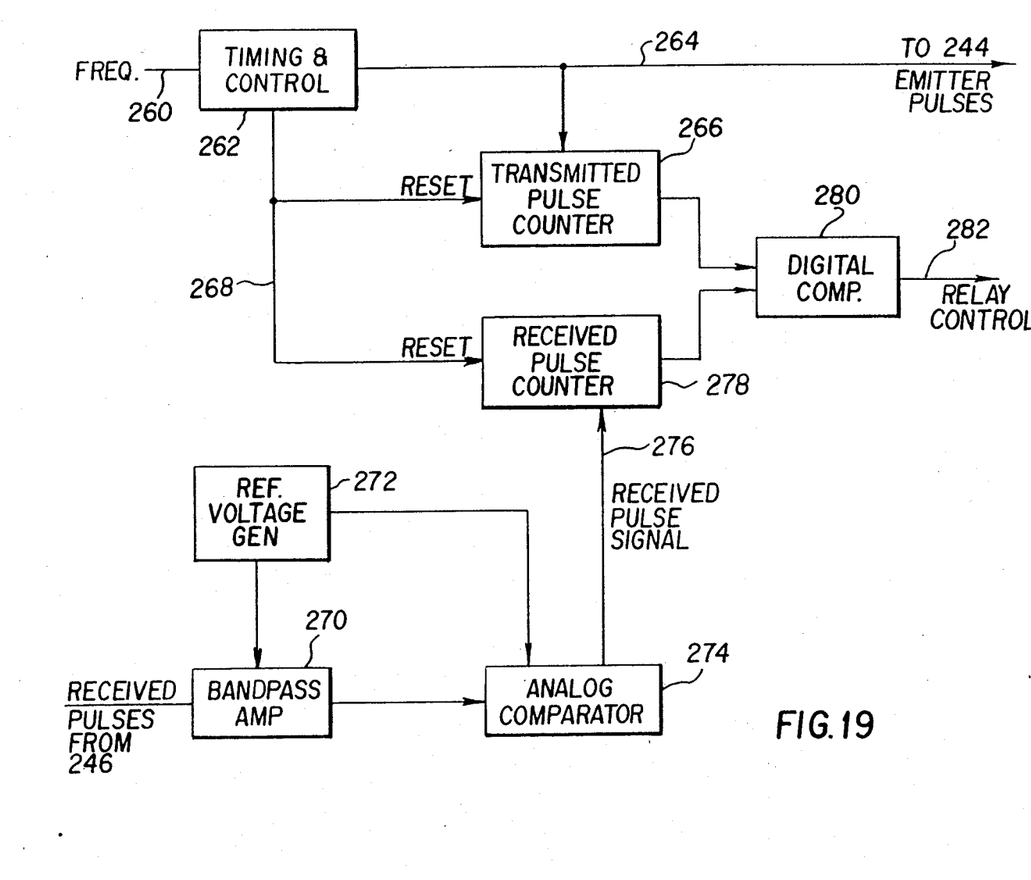
FIG. 19 is a functional block diagram of the circuit of the ASIC 248 of FIG. 18.

FIG. 19 is a functional block diagram of the circuit of the ASIC 248 of FIG. 18. In FIG. 19, a terminal 260 indicates a source of frequency that is typically a resistor-capacitor combination attached to the ASIC 248. The terminal 260 is connected to a timing and control block 262 which produces on a line 264 a pulse to control pulses from the emitter 244. The line 264 is also connected to a transmitted-pulse counter 266, which is reset by a signal from the timing and control block 262 on a line 268.

Received pulses from the detector 246 are taken to a bandpass amplifier 270, which is also coupled to a reference voltage generator 272. This is part of a system for protecting the system from operating in response to ambient light or other spurious signals. The reference voltage generator 272 and the bandpass amplifier 270 are coupled to an analog comparator 274, which produces a received-pulse signal on a line 276. The line 276 is connected to a received pulse counter 278, which is reset by the signal on the line 268. Outputs of the counters 266 and 278 are taken to a comparator 280, which produces an output on a line 282 that is taken to the transistor 250 of FIG. 18 to control the relay 252.

Figure 20:
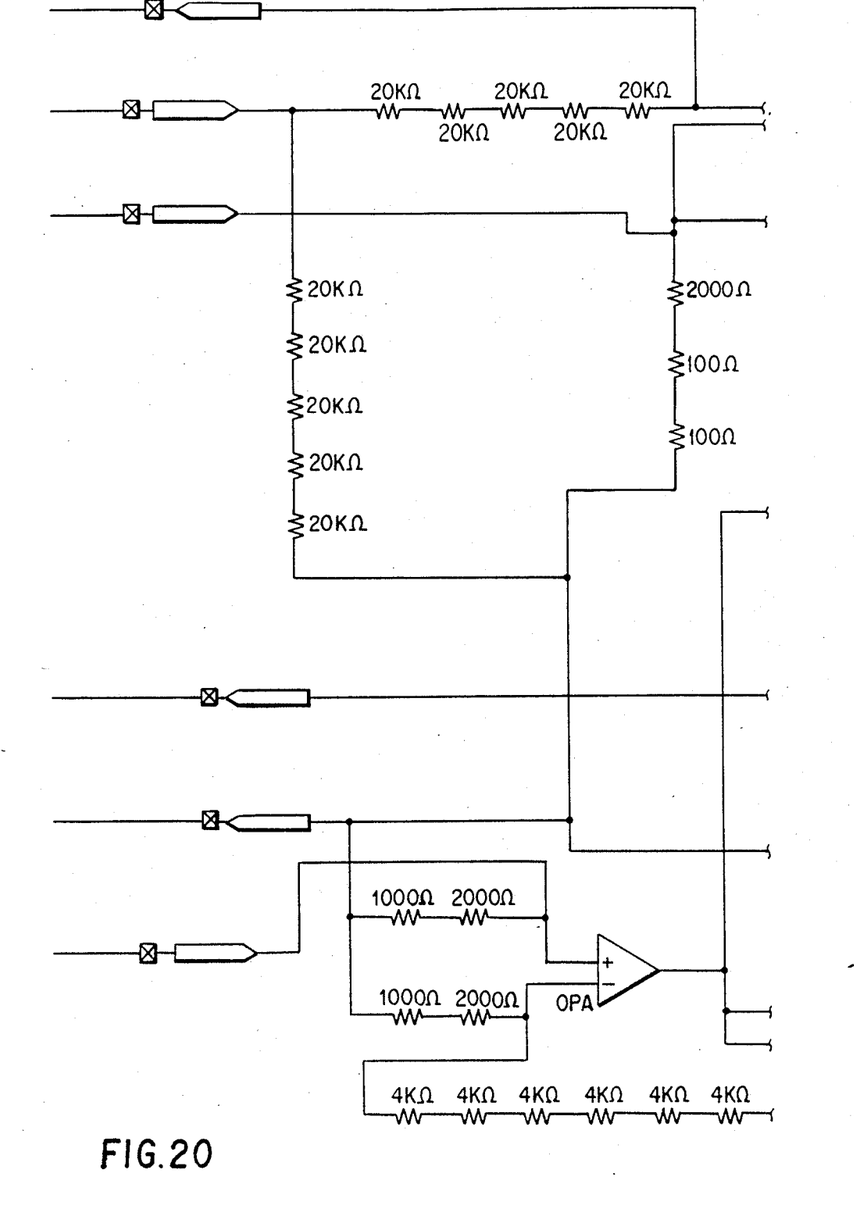
FIG. 20 represents a circuit element of a realization of the ASIC 249 of FIG. 18.
Figure 21:
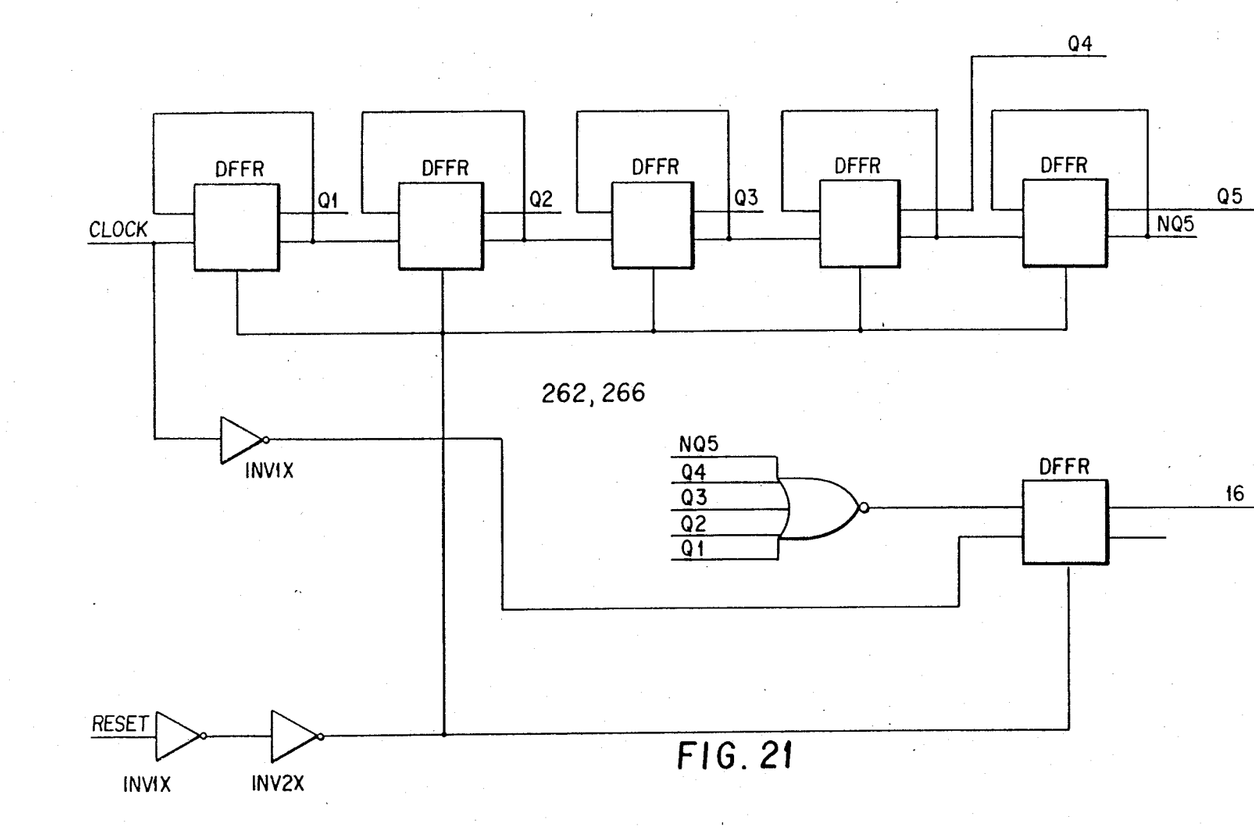
FIG. 21 represents a circuit element of a realization of the ASIC 249 of FIG. 18.
Figure 22:
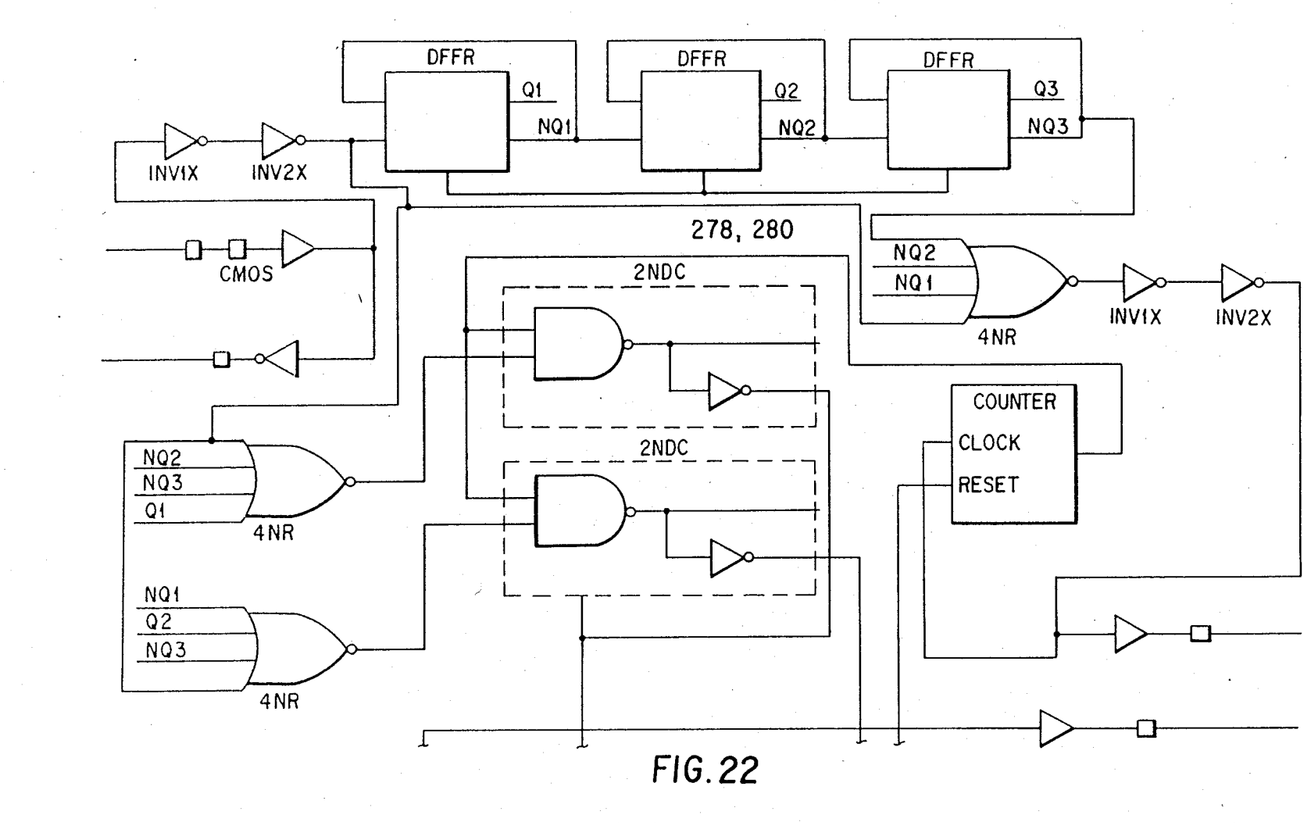
FIG. 22 represents a circuit element of a realization of the ASIC 249 of FIG. 18.

FIGS. 20, 21 and 22 represent circuit elements of a realization of the ASIC 248 of FIG. 18, identified as to the corresponding elements of FIG. 19. Thus, FIG. 20 is a realization of the bandpass amplifier 270, the reference voltage generator 272 and the analog comparator 274 of FIG. 18. FIG. 21 is a realization of the timing and control block 262 and the transmitted pulse counter 266 of FIG. 18, and FIG. 22 is a realization of the received-pulse counter 278 and the digital comparator 280 of FIG. 18.

The detailed description of the invention given here is for the purpose of illustration and should not be taken to limit the scope of the invention. That scope is determined by the appended claims and their equivalents.

What I claim is:

1. An apparatus for securing a fiber optic cable having an axis and a pliable plastic coating, the cable having a planar surface that intersects the axis of the cable, the apparatus comprising:

a housing having a channel therein;

means disposed at an end of said channel to stop the cable in a predetermined position in said housing that and to place the planar surface at a fixed location therein; and a clamp receivable in said housing that is movable in a direction substantially perpendicular to the axis of the cable between a first position in which the cable is movable in said channel and a second position that engages and compresses the plastic coating to secure the fiber optic cable in position, said clamp having a portion separated by an opening, and when said clamp is in said second position, the fiber optic cable is received in said clamp opening, and said clamp portion is engaged by said housing and forced by said housing into holding engagement with the fiber optic cable.

2. The apparatus of claim 1 wherein said clamp portion comprises a V-shaped portion that opens to a dimension that is greater than a diameter of the fiber optic cable and wherein said clamp further includes a slotted portion that has sides separated by a distance less than the diameter of the fiber optic cable.

3. The apparatus of claim 2 in addition comprising a handle that projects to enable an operator to move the clamp between the first position and the second position.

* * * * *